Patented Aug. 17, 1926.

1,596,668

UNITED STATES PATENT OFFICE.

JAMES LEWALLEN, OF ONEIDA, TENNESSEE.

COMPOSITION FOR SEALING NUTS AGAINST DISPLACEMENT AND PROCESS FOR MAKING THE SAME.

No Drawing.     Application filed November 23, 1925.   Serial No. 70,989.

This invention relates to a sealing composition for nuts and a process for making the same.

An object of the invention is the provision of a composition having sealing qualities adapted for use in connection with bolts and nuts which will retain a nut against movement when applied to vehicles or machines which are subjected to vibration or jolts thereby eliminating the use of mechanical means such as pins and lock nuts for preventing loosening of the nuts.

A further object of the invention is the provision of a composition in which a mixture of a rosin and sealing wax is employed for application to a nut or bolt or to both such elements for sealing a nut against movement after said nut has been screwed into position. The nut in such a case will retain its position against jars and vibrations but may be removed in the ordinary manner with a wrench when desired.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

In carrying out my invention a composition which is formed of raw pine rosin and sealing wax is heated and applied to the threads of a nut and bolt, and if desirable the bolt and nut are heated to approximately 150° F. when the nut may be screwed into position. In order to cause immediate contraction of the bolt and nut and the sealing composition, cold water is applied and the nut will remain in position against jars or vibration and can only be removed in the usual manner by a wrench without injury to the threads of the nut or bolt.

In carrying out the process for producing the composition I take 5 ounces of raw pine rosin and 11 ounces of commercial sealing wax formed of equal parts of shellac and Venetian turpentine. These ingredients are melted together and thoroughly stirred until an intimate mixture of the two ingredients is had. After this the mixture is placed in containers of the proper size for shipment and is allowed to cool.

I also may add to the above ingredients beeswax and English rosin in small quantities, preferably about 2 ounces of each. While these ingredients are not important it is desirable at times to use in the composition beeswax and English rosin.

When a nut and bolt have been treated with the combination it will not only provide a sufficient filler between the usual spaces between the threads of the nut and the threads of the bolt but will also act as an adhesive to prevent the nut from being jarred loose from its normal tight position. When sufficient pressure is applied with a wrench or other suitable tool the nut may be revolved so that the adhesive is broken and removed from its position without any injury whatever to the threads of either the nut or the bolt.

It will be appreciated that with my improved composition I have provided a nut and bolt construction having a film of an intimate mixture of rosin and sealing wax disposed between the coacting threads of the bolt and nut which will prevent accidental loosening of the nut from the bolt but will permit loosening of the nut in an ordinary manner by a wrench.

What I claim is:

1. A composition for preventing nuts from releasing their tightened position on bolts, comprising an intimate mixture of rosin and sealing wax formed of equal parts of shellac and Venetian turpentine.

2. A composition for preventing nuts from releasing their tightened position on bolts formed from a mixture of 5 parts by weight of molten rosin and 11 parts by weight of molten sealing wax formed of equal parts of shellac and Venetian turpentine.

In testimony whereof I have signed this specification.

JAMES LEWALLEN.